(12) United States Patent
Duch et al.

(10) Patent No.: US 11,833,853 B2
(45) Date of Patent: *Dec. 5, 2023

(54) SEALING DEVICE FOR A WHEEL HUB UNIT

(71) Applicant: Aktiebolaget SKF, Gothenburg (SE)

(72) Inventors: Daniele Duch, San Gillio (IT); Antonia Nastasi, Turin (IT); Laura Sguotti, Bricherasio (IT)

(73) Assignee: Aktiebolaget SKF

( * ) Notice: Subject to any disclaimer, the term of this patent is extended or adjusted under 35 U.S.C. 154(b) by 0 days.

This patent is subject to a terminal disclaimer.

(21) Appl. No.: 17/516,809

(22) Filed: Nov. 2, 2021

(65) Prior Publication Data

US 2022/0055403 A1  Feb. 24, 2022

Related U.S. Application Data

(63) Continuation of application No. 16/653,269, filed on Oct. 15, 2019, now Pat. No. 11,192,400.

(30) Foreign Application Priority Data

Oct. 24, 2018 (IT) .................. 102018000009716

(51) Int. Cl.
*B60B 27/00* (2006.01)
*F16J 15/08* (2006.01)

(52) U.S. Cl.
CPC ....... *B60B 27/0073* (2013.01); *F16J 15/0818* (2013.01); *B60B 2900/5112* (2013.01); *B60B 2900/5114* (2013.01)

(58) Field of Classification Search
CPC ...... F16J 15/0818; F16J 15/32; F16J 15/3248; F16J 15/3252; F16J 15/3268; B60B 27/0073; B60B 2900/5112; B60B 2900/5114; F16C 33/7886; F16C 33/7883; F16C 33/805; F16C 41/004
See application file for complete search history.

(56) References Cited

U.S. PATENT DOCUMENTS 3,999,815 A   12/1976 Dauwalder
6,027,122 A   2/2000 Bertetti et al.
(Continued)

FOREIGN PATENT DOCUMENTS

DE    19900283      7/1999
DE    112016003937  5/2018
(Continued)

OTHER PUBLICATIONS

Search Report for corresponding Italy Patent Application No. 102018000009716 dated Jun. 24, 2019.

*Primary Examiner* — Gilbert Y Lee
(74) *Attorney, Agent, or Firm* — Reed Smith LLP

(57) ABSTRACT

Sealing device for a wheel hub unit is disclosed herein, wherein the sealing device being able, during use, to form a static seal for protecting the wheel hub unit from any environmental pollutant and being provided with a screen, which is engaged with a collar of the wheel hub unit and has a bottom wall, a cylindrical side wall integral with and more or less perpendicular to the bottom wall. The sealing device is designed and structured to protect the wheel hub unit from any environmental contaminant that the wheel hub unit may be exposed to during usage.

14 Claims, 2 Drawing Sheets

(56) References Cited

U.S. PATENT DOCUMENTS

| | | | |
|---|---|---|---|
| 2014/0193107 A1 | 7/2014 | Baratti et al. | |
| 2014/0193108 A1* | 7/2014 | Baratti | B60B 27/0005 |
| | | | 384/448 |
| 2016/0178010 A1* | 6/2016 | Kaiser | F16C 33/7896 |
| | | | 277/351 |
| 2016/0368316 A1* | 12/2016 | Kaiser | B60B 27/0073 |
| 2017/0087934 A1* | 3/2017 | Duch | F16C 33/7886 |
| 2017/0198748 A1 | 7/2017 | Seo | |
| 2018/0080563 A1 | 3/2018 | Shuto | |

FOREIGN PATENT DOCUMENTS

| | | |
|---|---|---|
| IT | 102015000056435 | 9/2015 |
| JP | H11174068 | 7/1999 |
| JP | 2014137122 | 7/2014 |
| JP | 2015006031 | 1/2015 |

* cited by examiner

SEALING DEVICE FOR A WHEEL HUB UNIT

CROSS-REFERENCE TO RELATED APPLICATION

This application is a continuation of, and claims the benefit under 35 U.S.C. § 120 of the earlier filing date of, copending U.S. Ser. No. 16/653,269 filed on Oct. 15, 2019, which is based on and claims priority under 35 U.S.C. § 119 to Italian Application No. 102018000009716, filed Oct. 24, 2018, the entire contents of which are incorporated herein by reference.

TECHNICAL FIELD

The inventive concepts of example embodiments disclosed herein relate to a sealing device for a wheel hub unit. The example embodiments in accordance with this disclosure are directed to the field of wheel hub units for non-driving wheels of vehicles, namely wheel hub units not provided with an axle shaft passing along an axis of rotation of a respective wheel hub unit, where the associated sealing devices have an axial symmetrical "cup-shaped" form so as to seal off a space situated between an outer ring and an inner ring of the respective wheel hub unit.

BACKGROUND

The sealing devices of the known type are made so as to be stably connected to an outer ring of a wheel hub unit, and since the outer ring of the wheel hub unit is a non-rotating ring, these sealing devices form a static seal which protects the wheel hub unit from any environmental contaminant (e.g., water, mud, dirt, etc.).

The non-limiting example embodiments in accordance with this disclosure provide a sealing device for at least one wheel hub unit, which is devoid of the drawbacks described above.

DETAILED DESCRIPTION

According to Italian Patent Application No. 102015000056435, filed in the name the present Applicant, discloses a sealing device provided with a more or less cup-shaped sheet-metal screen. The sealing device comprises a mounting cylindrical side wall keyed onto a collar of the outer ring of the hub unit forcibly with radial interference and defined by two sheet-metal layers which are completed folded onto each other; a substantially radially extending circular bottom wall integral with the mounting cylindrical side wall and arranged radially on the inside of the said mounting cylindrical side wall; and an annularly extending annular stop edge integral with the mounting cylindrical side wall and arranged radially on the outside of the said mounting cylindrical side wall so as to bear, during use, axially against the collar of the outer ring.

The sealing device disclosed in Italian Patent Application No. 102015000056435 further comprises a sealing fluid which is defined by a liquid glue, a paint or other liquid or semi-liquid sealing substance. The sealing device being designed to be applied between the annular stop edge and the collar so as to assist the metal-to-metal sealing action between the said annular edge and collar. Thereby, preventing the infiltration of water and contaminants and consequently reducing the risk of oxidation and formation of rust along all the inner surfaces of the wheel hub unit.

The solution according to Italian Patent Application No. 102015000056435, assists in a satisfactory manner the metal-to-metal sealing action between the annular edge and the collar. However, it does not prevent infiltration of liquids and contaminants, in their entirety, between the annular stop edge and the collar of the outer ring. Moreover, such solution also has a number of additional drawbacks due to the liquidity of the sealing liquid and also to the fact that this sealing liquid, once it is compressed between the annular stop edge and the collar, although being distributed along the entire annular stop edge, also tends to spread, thereby penetrating inside the wheel hub unit and seeping out from the wheel hub unit.

The inventive concepts of example embodiments disclosed herein are directed to a sealing device that address these drawbacks, and protects the wheel hub unit from any environmental contaminant that the wheel hub unit may be exposed to.

Figure 1:
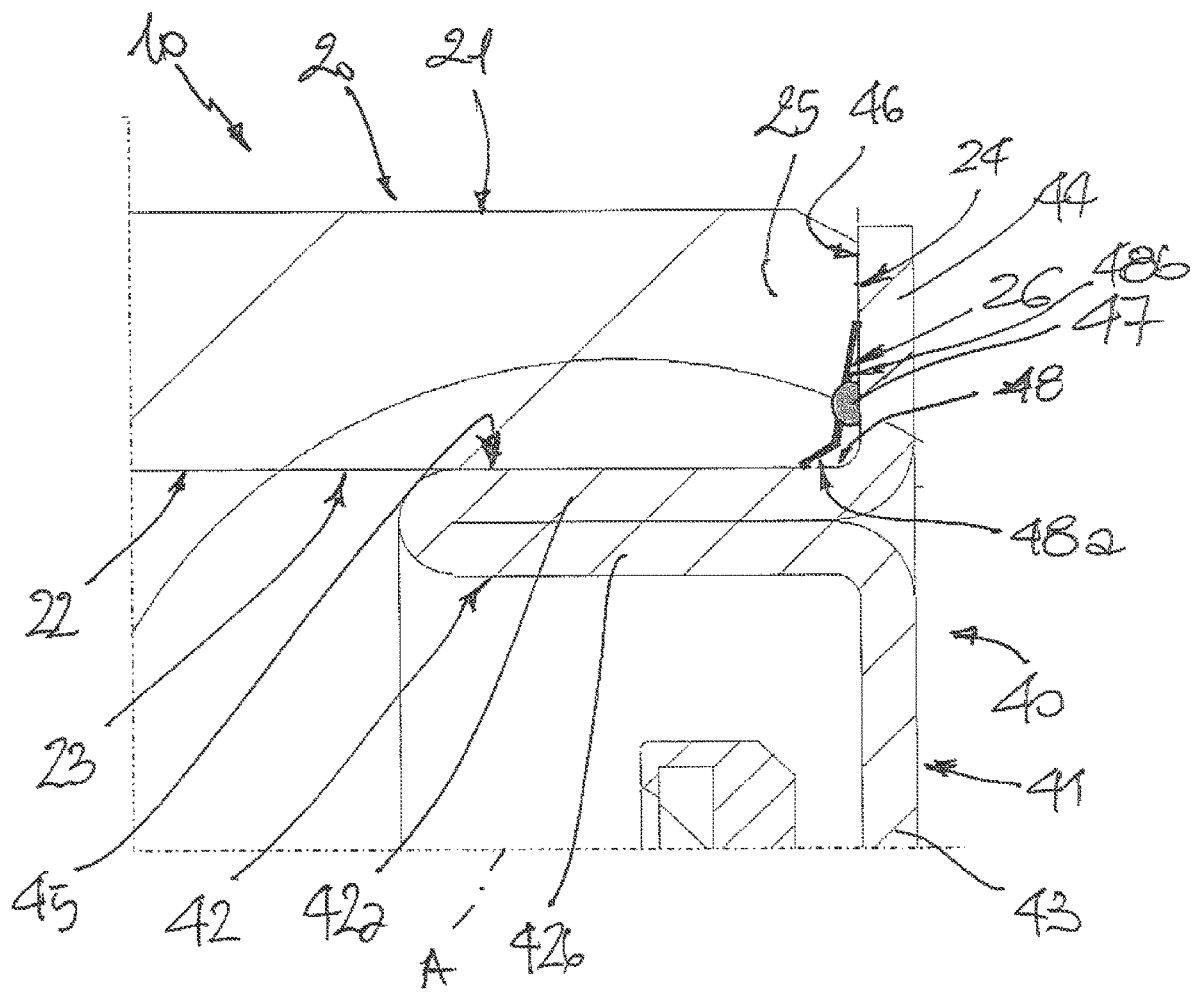
FIG. 1 is an axial symmetrical cross-section through a sealing device for a wheel hub unit in accordance with an example embodiment of this disclosure.

With reference to FIG. 1, in accordance with exemplary embodiments of inventive concepts disclosed herein a wheel hub unit 10 is illustrated. —The wheel hub unit 10 comprising a non-rotatable outer ring 20 provided with an axis of symmetry A.

One skilled in the art will appreciate that the terms and expressions indicating positions and orientations such as "radial" and "axial" are understood as referring to the central axis of symmetry A of the wheel hub unit 10. Expressions such as "axially outer" and "axially inner" refer instead to the assembled condition and, in the specific case, preferably refer to a wheel side and, respectively, to a side opposite to the wheel side.

The outer ring 20 of the wheel hub unit 10 is radially bounded by an outer cylindrical surface 21 and by an inner cylindrical surface 22, which are coaxial with each other and with axis A. Further, the outer ring 20 is axially bounded by an annular surface 24, which is transverse to axis A and to both the outer and inner cylindrical surfaces 21 and 22. The inner cylindrical surface 22 bounds an internal space 23 of the wheel hub unit 10. The annular surface 24 is an axially inner front surface of the outer ring 20. The annular surface 24 defines, together with the outer and inner cylindrical surfaces 21 and 22, a collar 25 of the outer ring 20, and is provided with a shaped annular groove 26, in the manner described further below.

In order to seal off the space 23, the wheel hub unit 10 is provided with a sealing device 40, which is stably connected to the outer ring 20 and, since the outer ring 20 is a non-rotating ring, the sealing device 40 forms a static seal, protecting the wheel hub unit 10 from any environmental contaminants (water, mud, dirt, etc.).

The sealing device 40, according to an example embodiment, comprises a screen 41. The screen 41 may be made or composed of at least sheet metal or plastic. The screen 41 may be keyed inside the outer ring 20, which bears, as will be explained in greater detail below, against the front surface 24 of the outer ring 20. The screen 41 may comprise at least a mounting cylindrical side wall 42, which is keyed inside the collar 25 of the outer ring 20 forcibly by means of radial interference, and is defined by two layers 42*a* and 42*b*. The two layers 42*a*, 42*b*, according to an example embodiment, may be made of sheet metal and folded completely onto each other. The screen 41 may further comprise a substantially radially extending circular bottom wall 43 integral with the mounting cylindrical side wall 42, and arranged radially on the inside of the mounting cylindrical side wall 42. Further, the screen 41 may also comprise an annularly extending stop edge 44 integral with the mounting cylindrical side wall 42. The annularly extending stop edge 44 being arranged radially on the outside of the mounting cylindrical side wall 42 so as to bear, during use, axially against the collar 25 of the outer ring 20 or rather the annular surface 24.

In an example embodiment shown in accordance with this disclosure, the bottom wall 43 has a thickness equal to half a thickness of the mounting cylindrical side wall 42, which provides the screen 41 with a greater strength and rigidity. Further, the bottom wall 43 may be radially bounded outwards by a cylindrical keying surface 45, which may be directly engaged with the inner cylindrical surface 22 in the collar 25 of the outer ring 20, while the annular stop edge 44 is axially bounded towards the outer ring 20 by an annular surface 46 transverse, and adjacent to the surface 45 and arranged in direct contact with the surface 24.

The sealing device 40 also comprises a closed shaped seat 48, which is defined, and also bounded, by the groove 26 and by the surfaces 45 and 46 of the screen 41, and a sealing gasket 47 or sealing liquid gasket 47. The sealing gasket 47 is schematically shown in FIG. 1 in its transportation and/or mounting configuration, and is defined by an anaerobic sealing liquid formulated to fill and seal the seat 48 and designed to polymerize when it is closed between the surfaces bounding the collar 25 and the screen 41 and facing each other, namely the surfaces 24, 25, 46 and the groove 26. Depending on the operational requirements, the anaerobic sealing liquid gasket 47 is designed to be applied alternately either onto the surface 46 of the annular stop edge 44 of the screen 41 or onto the groove 26 of the collar 25 so as to assist with the sealing action between the annular stop edge 44 and the collar 25. Thereby, forming, after mounting and polymerization, completely inside the seat 48, the flexible sealing liquid gasket 47, which is resistant to chemical substances and which does not deteriorate and does not break over time, and also prevents infiltration of water and contaminants. Consequently, reducing the risk of oxidation and the formation of rust along all the internal surfaces of the wheel hub unit 10.

The example embodiments according to this disclosure provided improvement over conventional technology as a seat 48 having a maximum axial and/or radial width of 0.25 mm (millimetre) was combined with a sealing liquid gasket 47 having a viscosity in the range of 500,000-1,000,000 mPa·s (millipascal-second). Also, according to an example embodiment shown in FIG. 1, in order to optimize this axial and/or radial width, the seat 48, on the side of the screen 41, is bounded by the surfaces 45 and 46 while, on the side of the groove 26, it is bounded by a first bottom surface 48*a* of the annular groove 26 facing the surface 45 and inclined with respect to the said surface 45, and by a second bottom surface 48*b* of the groove 26 facing the surface 46 and inclined with respect to the surface 46. The two surfaces 48*a* and 48*b* are adjacent to each other and the surface 48*a* has a frontal extension relative to the surface 45, which is smaller than a frontal extension of the surface 48*b* relative to the surface 46, in order to allow a greater distribution of the liquid gasket 47 between the surfaces 48*b* and 46, namely so as to allow the liquid gasket 47 to spread inside the seat 48 also following a small pressure of the screen 41 against the collar 25.

Some of the advantages and technical improvements of using a sealing gasket 47 such as that described above, namely with a viscosity of between 500,000 and 1,000,000 mPa·s, also lies in the fact that this sealing gasket 47 may be positioned on the annular stop edge 44 in the configuration as shown in FIG. 1. Namely forming either a continuous annular bead of anaerobic sealing liquid or forming a series of droplets of anaerobic sealing liquid adjacent to each other, without any risk of the sealing liquid being dispersed before mounting of the screen 41 inside the collar 25 and, in particular, without any risk that the sealing liquid may unexpectedly come of the seat 48 once assembly has been performed and while it is polymerizing to form the gasket 47. Alternatively, still with the same advantages and technical improvements explained above, the sealing gasket 47 may also be positioned in the groove 26 of the collar 25, against the second bottom surface 48*b* of the groove 26, namely forming either a continuous annular bead of anaerobic sealing liquid in contact with the collar 25 or forming a series of droplets of anaerobic sealing liquid adjacent to each other, again in contact with the collar 25.

In this connection, it should be pointed out that, also in the case of the configuration of the seat 48 as described above, all the sealing liquid may be contained within it, namely the sealing gasket 47 may be formed only inside the seat 48 without any of the said sealing liquid seeping externally during polymerization thereof.

The configuration of the seat 48 described above has been provided here by way of a non-limiting example. The seat 48 being able to be configured depending on the specific requirements of the type of application and the dimensions both of the collar 25 and of the screen 41.

Figure 2:
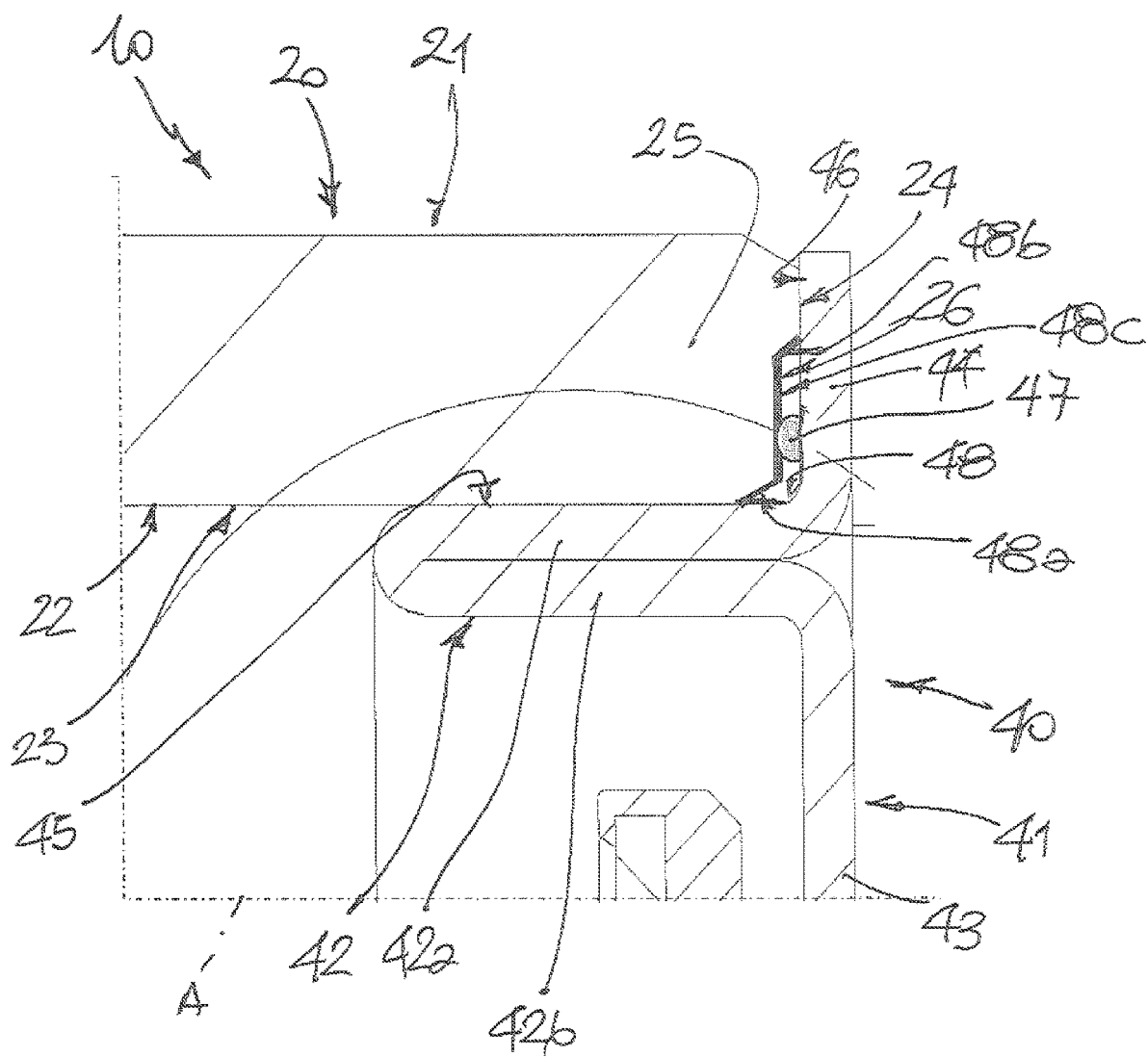
FIG. 2 is an axial symmetrical cross-section through a sealing device for a wheel hubin accordance with an example embodiment of this disclosure.

In fact, in the case where the operating conditions of the wheel hub unit 10 happen to be more severe and a sealing device 40 with an even more effective static sealing performance is required, the seat 48, as shown in the alternative embodiment of FIG. 2, may have between the surfaces 48*a* and 48*b* a further bottom surface 48*c*, transverse to the axis A, namely parallel to and facing the surface 46. In this case, the surface 48*a* and the surface 48*b* have a similar frontal extension relative to the surfaces 45 and 46, respectively, while the surface 48*c* has a frontal extension relative to the surface 46 decidedly greater in size than the frontal extension of the surface 48*a*.

Likewise in an alternative example of embodiment shown in FIG. 2, the configuration of the seat 48 is able to allow a greater distribution of the liquid gasket 47 between the surfaces 48*b*, 48*c* and 46, and retain therein the sealing liquid during its polymerization for corresponding transformation into the gasket 47.

The solution adopted, in the alternative embodiments illustrated above, is not only easy to apply since the screen 41 may be handled and moved without risk of spillage of sealing liquid, but is also technically advantageous since the sealing gasket 47, in combination with the associated seat 48, improves both the seal between the outer ring 20 and screen 41 such that it is equivalent, if not even superior, to the gaskets formed using an elastomer element and, in particular, ensure easy assembly of the screen 41, i.e. of the sealing device 40, together with the outer ring 20, namely with the wheel hub unit 10.

Moreover, owing to the different embodiments described above, the process of mounting the sealing device 40, in addition to being faster, since it does not require any calibration of elastomer elements nor any precautions, e.g. for the handing of liquid glues or other liquid or semi-liquid sealing substances, is further simplified by the flexibility offered by the operation of depositing the sealing liquid described above, either onto the annular stop edge 44 of the sealing device 40, or inside the groove 26 of the collar 25.

In addition to the example embodiments in accordance with this disclosure, as described above, it is to be understood that numerous further variants are possible. For example, the configuration described envisages an outer ring of the wheel hub unit 10 and the sealing device 40 which are both stationary, but the invention could also be applied to the case where the outer ring and the sealing device 40 are both rotatable. One skilled in the art may also appreciate that embodiments in accordance with this disclosure are only examples and do not limit the subject of the inventive concepts disclosed herein, nor its applications, nor its possible configurations. On the contrary, although the description provided above enables the person skilled in the art to implement the example embodiments at least in one of its examples of configuration, it must be understood that numerous variations of the components described are feasible, without thereby departing from the scope of the inventive concepts of the present application, as defined in the accompanying claims, interpreted literally and/or in accordance with their legal equivalents.

What is claimed is:

1. A sealing device, comprising:
   a screen comprising a bottom wall coupled to a collar of a wheel hub unit;
   a cylindrical side wall integral and perpendicular to the bottom wall, wherein a thickness of the cylindrical side wall is twice a thickness of the bottom wall;
   a stop edge integral with the cylindrical side wall on an opposite side to the bottom wall, the stop edge configured to bear, during use, axially against the collar;
   a seat bound by a shaped groove formed in the collar and the screen, the seat comprising a closed shape; and
   a sealing gasket comprising a sealing liquid, wherein the sealing liquid is anaerobic and formulated to fill and seal the seat, and the sealing liquid is configured to polymerize when closed between the collar and the screen,
   wherein the sealing gasket is applied onto the groove of the collar.

2. The sealing device of claim 1, wherein
   the seat comprises a first bottom surface and a second bottom surface,
   the first and second bottom surfaces facing respective surfaces of the screen,
   the first and second bottom surfaces are inclined with respect to the respective surfaces of the screen, and
   the second bottom surface faces the stop edge.

3. The sealing device of claim 2, wherein the first and second bottom surfaces are adjacent to each other, and the first bottom surface comprises an extension smaller than an extension of the second bottom surface.

4. The sealing device of claim 1, wherein the stop edge further comprises a surface facing the collar, wherein the sealing liquid is applied onto the surface facing the collar.

5. The sealing device of claim 1, wherein the sealing gasket is positioned against the groove, forming a continuous annular bead of sealing liquid in contact with the collar.

6. The sealing device of claim 1, wherein the sealing gasket is positioned against the groove, forming a series of droplets of sealing liquid adjacent to each other and in contact with the collar.

7. A sealing device, comprising:
   a screen comprising a bottom wall coupled to a collar of a wheel hub unit;
   a cylindrical side wall integral and substantially perpendicular to the bottom wall, wherein a thickness of the cylindrical side wall is twice a thickness of the bottom wall;
   a stop edge comprising a surface facing the collar, wherein the stop edge is integral with the cylindrical side wall on an opposite side to the bottom wall, the stop edge configured to bear, during use, axially against the collar;
   a seat bound by a shaped groove formed in the collar and the screen, the seat comprising a closed shape; and
   a sealing gasket comprising a sealing liquid and applied to the surface of the stop edge, wherein the sealing liquid is anaerobic and formulated to fill and seal the seat, and the sealing liquid is configured to polymerize when closed between the collar and the screen,
   wherein,
   the seat comprises a first bottom surface and a second bottom surface,
   the first and second bottom surfaces face respective surfaces of the screen,
   the first and second bottom surfaces are inclined with respect to the respective surfaces of the screen,
   the second bottom surface faces the stop edge,
   the first and second bottom surfaces are adjacent to each other, and
   the first bottom surface comprises an extension smaller than an extension of the second bottom surface.

8. The sealing device of claim 7, wherein the sealing liquid is applied onto the groove of the collar.

9. The sealing device of claim 7, wherein the sealing gasket is positioned against the groove, forming a continuous annular bead of sealing liquid in contact with the collar.

10. The sealing device of claim 7, wherein the sealing gasket is positioned against the groove, forming a series of droplets of sealing liquid adjacent to each other and in contact with the collar.

11. A sealing device, comprising:
    a screen comprising a bottom wall coupled to a collar of a wheel hub unit;
    a cylindrical side wall integral and substantially perpendicular to the bottom wall, wherein a thickness of the cylindrical side wall is twice a thickness of the bottom wall;
    a stop edge integral with the cylindrical side wall on an opposite side to the bottom wall, the stop edge configured to bear, during use, axially against the collar;
    a seat bound by a shaped groove formed in the collar and the screen, the seat comprising a closed shape; and
    a sealing gasket comprising a sealing liquid, wherein the sealing liquid is anaerobic and formulated to fill and seal the seat, and the sealing liquid is configured to polymerize when closed between the collar and the screen,
    wherein,
    the seat comprises a first bottom surface, a second bottom surface, and a third bottom surface,
    the first and second bottom surfaces face respective surfaces of the screen,
    the first and second bottom surfaces are inclined with respect to the respective surfaces of the screen,
    the second bottom surface facing the stop edge, and the third bottom surface is between the first bottom surface and the second bottom surface, the third bottom surface facing the stop edge.

12. The sealing device of claim 11, wherein the stop edge further comprises a surface facing the collar, wherein the sealing liquid is applied onto the surface of the stop edge.

13. The sealing device of claim 11, wherein the sealing gasket is positioned against the groove, forming a continuous annular bead of sealing liquid in contact with the collar.

14. The sealing device of claim 11, wherein the sealing gasket is positioned against the groove, forming a series of droplets of sealing liquid adjacent to each other and in contact with the collar.

* * * * *